Jan. 24, 1950     R. U. BERRY     2,495,228
REVERSIBLE REGULATING VALVE SYSTEM
Filed July 17, 1947
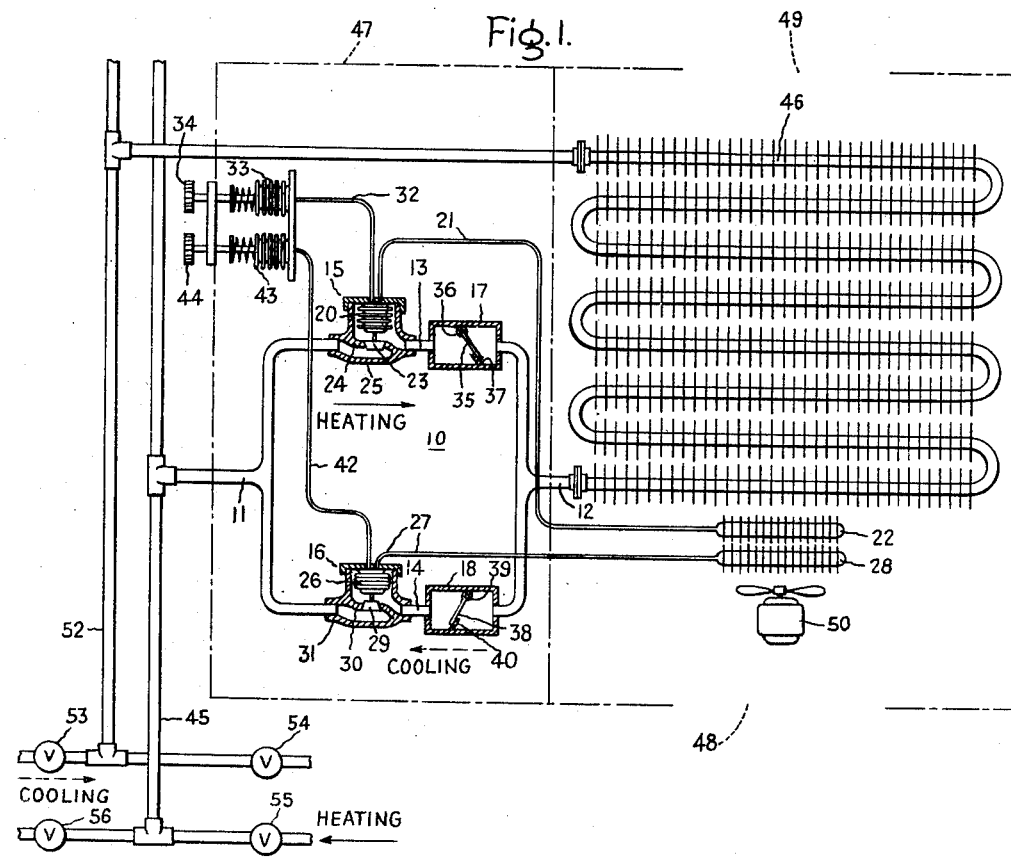
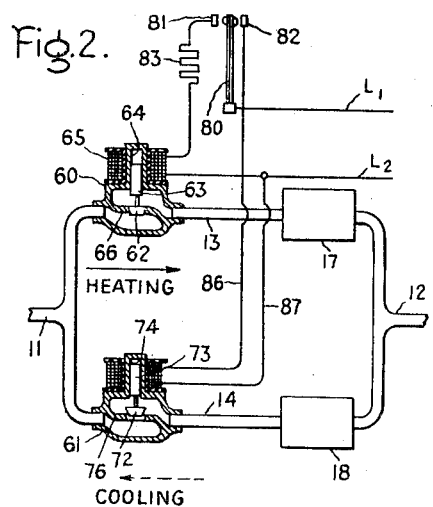
Inventor:
Robert U. Berry,
by Edwin L. Rich
His Attorney.

Patented Jan. 24, 1950

2,495,228

UNITED STATES PATENT OFFICE 2,495,228

REVERSIBLE REGULATING VALVE SYSTEM

Robert U. Berry, East Orange, N. J., assignor to General Electric Company, a corporation of New York Application July 17, 1947, Serial No. 761,704

5 Claims. (Cl. 236—1)

The invention relates to inverse condition responsive flow regulating valve system, particularly inverse thermostatic heating and cooling medium flow regulating valve systems of the flow reversal type such as disclosed and claimed in the Knaus application, Serial Number 747,760, filed May 13, 1947, and the Lum application Serial Number 761,675, filed July 17, 1947, both assigned to the present assignee. In systems of this type selective adjustment of the temperatures at which the flow of heating medium is decreased and the flow of cooling medium is increased and vice versa is desirable, particularly for room heating and cooling service.

The principal object is to obtain separately adjustable inverse condition responsive flow control by combining a pair of conventional flow control valves having separately adjustable inverse or opposite condition responsive operating means with a pair of reversed check valves in parallel flow paths provided in a reverse circulation system.

Another object is to enable a pair of separately adjustable inverse thermostatic flow control valves of conventional form and a reversed pair of check valves of conventional form to provide selective inverse thermostatic flow control upon the flow of heating and cooling medium in opposite directions in a reverse heat exchange system.

Another object is to interconnect an inverse pair of separately adjustable heating and cooling thermostatic flow modulation valves, one adjustable for opening and the other separately adjustable for closing in response to temperature changes, in parallel flow paths in a reverse flow circulating system for heating and cooling medium with a corresponding one of a pair of reversed check valves in each parallel path for selectively rendering the thermostatic valve therein effective or ineffective to modulate the flow dependent upon the direction of flow in the system.

Further objects and advantages of the invention will appear in the following description of the accompanying drawing in which Fig. 1 is a schematic view partly in section of a room heating and cooling medium reverse circulating system controlled by a pair of separately adjustable inverse thermostatic flow modulation valves combined with a pair of check valves in accordance with the preferred form of the present invention; and Fig. 2 is a modification utilizing a pair of conventional electromagnetic valves selectively operable under the control of a separately adjustable heating and cooling thermostat in accordance with the invention.

The improved selectively adjustable inverse automatic flow modulation valve combination shown in Fig. 1 is indicated collectively by the reference character 10 and reversely modulates the flow between the communicating flow passages 11 and 12 that are interconnected by the parallel flow paths 13 and 14. The flow each way between the passages 11 and 12 is selectively modulated by a pair of separately adjustable inverse automatic condition responsive valves 15 and 16 of conventional form operating in conjunction with the pair of reversed check valves 17, 18, of conventional form and each connected in a corresponding one of the parallel flow paths 13, 14 for rendering the corresponding separately adjustable automatic valve 15 or 16 effective only upon flow in the direction indicated by the arrows.

The automatic flow modulation valve 15, in the conventional form shown, is of the thermostatic type provided with the expansible liquid filled operating bellows 20 interconnected by the tube 21 with a liquid filled bulb 22 that is responsive to the temperature to be controlled. The operating bellows 20 is suitably connected to operate the movable valvular element 23 towards and away from the valve seat 24 formed in the valve casing 25 upon increase and decrease respectively in the temperature to which bulb 22 is subjected. The inverse thermostatic flow modulation valve 16 also is of conventional form and provided with the expansible liquid filled bellows 26 interconnected by tube 27 with the liquid filled bulb 28 that is subjected to the same temperature to be controlled as bulb 22. However, the bellows 26 operates so as to move valvular member 29 away from and towards the valve seat 30 formed in the valve casing 31 upon increase and decrease respectively of the temperature to which bulb 28 is subjected. Thus with the pair of inverse thermostatic flow modulation valves 15 and 16 of conventional form and responsive to the same temperature changes when the controlled temperature increases, valve 15 will tend to decrease the flow while valve 16 will tend to increase the flow and vice versa. In order to adjust the temperature range within which valve 15 will operate to modulate the flow the liquid filled operating bellows 20 is connected by tube 32 with the variable volume liquid filled bellows 33 having the expansion and contraction thereof controlled by the manual adjusting member 34 in the conventional manner. Likewise, the liquid filled operating bellows 26 of the reversed flow modulating valve 16 is connected by tube 42 with the separately adjustable variable volume liquid filled temperature range control bellows 43 having the expansion and contraction thereof controlled by the separate manual adjusting member 44.

The pair of reversed check valves 17 and 18 also may be of conventional form with the valve 17 connected in the flow path 13 so as to permit flow only in the direction indicated by the arrow marked "Heating" and with the reversed check valve 18 connected in the parallel flow path 14 so as to permit flow only in the opposite direction indicated by the arrow marked "Cooling." Thus each of the pair of reversed check valves 17 and 18 is connected in a corresponding one of the parallel flow paths for selectively rendering the corresponding condition responsive valve effective only upon flow in a corresponding direction. The check valve 17 is shown provided with a movable valvular member 35 having a pivot axis 36 and normally biased into engagement with the valve seat member 37 so that the valve member 35 can move in the opening direction upon flow through the path 13 in the direction indicated by the arrow marked "Heating" and block flow in the opposite direction. Likewise, the reversed check valve 18 is provided with a movable valvular member 38 pivoted at 39 and biased into engagement with the valve seat member 40 so as to enable the valve member 38 to open in response to flow in the path 14 in the direction indicated by the arrow marked "Cooling" and block flow in the opposite direction.

In the room heating and cooling system illustrated in the drawing the flow passage 11 is in communication with the heating medium supply main 45 and the passage 12 communicates with one end of the finned tube heat exchange coil 46 of a conventional room air conditioning unit that may have an enclosing casing as indicated by the dotted lines 47 provided with an air inlet 48 and an air outlet 49 and with a suitable motor driven fan 50 for circulating room air first over the temperature responsive bulbs 22 and 28 and then over the finned tube heat exchange coil 46 that is located out of heat exchange relation with the bulbs. The other end of the finned tube coil 46 is connected to the cooling medium supply main 52 which may either be connected through the valve 53 with a suitable source of cooling medium or through the valve 54 to serve as a return to a suitable source of heating medium when valve 55 is opened to supply heating medium therefrom to the supply main 45. When the heating medium return and supply valves 54 and 55 are both closed, then the valve 56 may be opened to enable the main 45 to serve as a return for the cooling medium supplied to main 52 upon opening of valve 53. Thus it will be seen that heating medium is circulated in the room heating and cooling system in one direction while cooling medium is circulated in the system in the opposite direction.

*Operation*

Assuming that valve 55 is opened to connect the heating medium supply main 45 with a suitable source of heating medium (not shown) and valve 54 is opened to connect the main 52 to return the heating medium to said source, the heating medium will circulate from main 45 into passage 11 and thence through the heating medium flow modulating valve 15 and check valve 17 in series in path 13 and thence through passage 12 into the finned tube heat exchange coil 46 of the room air conditioning unit and return by main 52 and valve 54 to the source. The check valve 18 serves to block the flow of heating medium through the parallel path 14.

Under heating conditions when the temperature of the room air circulated by fan 50 over bulb 22 increases, then bellows 20 will expand as determined by the adjustment of member 34 move valve element 23 towards seat 24 and thereby reduce the heat flow of heating medium through the path 13 to the heat exchange coil 46 and hence decrease the heat release to the room. Conversely, when the temperature of the room air to which bulb 22 is subjected decreases, bellows 20 contracts to move valvular element 23 away from seat 24 and thereby increase the flow of heating medium through the path 13 to the room exchange element 46 and hence increase the heat release to the room. In this way the heating control valve 15 operates in response to variation in the room air temperature as controlled by the adjustment of manual adjustment member 34 to modulate the flow of heating medium to the heat exchange coil 46 so as to maintain a desired temperature in the room.

When the room ambient temperature conditions change so that cooling of the room becomes desirable, then the heating medium circulation control valves 54 and 55 are closed and the cooling medium circulation control valves 53 and 56 are opened. As a result, cooling medium flows through valve 53 into main 52 and thence through the finned tube heat exchange coil 46 to the passage 12 with the flow in the opposite direction to the flow of heating medium as previously described. In this case, check valve 17 serves to block the flow of the cooling medium through the path 13 while check valve 18 opens to render the cooling control valve 16 effective to modulate the flow of the cooling medium. Thus when the temperature of the room air circulated by fan 50 over bulb 28 and coil 46 increases, then bellows 26 will expand as determined by adjustment of manual member 44 to move valvular member 29 away from seat 30 and thereby increase the flow of heating medium through coil 46 to correspondingly increase the cooling of the room air. In case the cooling demand of the room decreases so that the temperature of the room air circulated over the bulb 28 correspondingly decreases then bellows 26 contracts to move valvular member 29 towards seat 30 and thereby reduce the flow of cooling medium through the coil 46 with a corresponding reduction in cooling of the room air. In this way, valve 16 modulates the flow of cooling medium in response to temperature changes of the bulb 28 so as to vary the cooling action of coil 46 to maintain a desired room temperature.

While the heat control valves 54 and 55 and the cooling control valves 53 and 56 are schematically indicated in the drawing as of the manually operated type, it will be understood that these valves may be automatically operated, if desired, in response to outdoor temperature changes or other similar variables.

Also it will be understood that suitable pumping mechanism may be provided, if desired for circulating the heating and cooling medium in opposite directions in the system, with suitable bypass valves provided for insuring a continuous circulation in the system even though the thermostatic flow modulating valves may be closed, all as illustrated and described in the aforesaid Knaus application, Serial Number 747,760.

In the modification shown in Fig. 2, a pair of electromagnetically operated valves 60 and 61 of conventional form are connected to control the flow in the parallel flow paths 13 and 14 that interconnect the flow passages 11 and 12. In the form shown, the electromagnetic valve 60 is provided with a movable valvular member 62 connected to the armature 63 that reciprocates inside the sealing tube 64 upon energization and deenergization of the operating electromagnet 65. When the armature 63 is attracted valvular member 62 is moved out of engagement with the valve seat 66 and when the operating electromagnet 65 is deenergized the valve member 62 is biased into engagement with seat 66. The electromagnetic valve 61 is shown identical in construction with the valve 60 and is provided with the movable valvular member 72, armature 73, sealing tube 74, operating electromagnet 75 and valve seat 76.

The pair of electromagnetic flow control valves 60 and 61 are operated under the selective control of the double adjustable contact thermostat 80 that may be located in the path of the incoming room air to the room air conditioning unit in a position corresponding to that of the bulbs 22 and 28 in Fig. 1. The thermostat 80 engages the adjustable contact 81 when the room air temperature falls to a value dependent upon the adjustment and engages the adjustable contact 82 when the room temperature increases to a value dependent upon the adjustment.

*Operation of Fig. 2*

With the automatic thermostatically controlled electromagnetic valve combination shown in Fig. 2 connected in the room heating and cooling reverse flow circulating system shown in Fig. 1, the operation is as follows. When heating medium is circulated in the system in the direction indicated by the arrow, the check valve 17 opens to render the electromagnetic valve 60 effective to regulate the flow through path 13 while the check valve 18 blocks the flow of heating medium through the parallel path 14, thereby rendering the electromagnetic valve 61 ineffective.

When the room temperature decreases so that thermostat 80 engages with adjustable contact 81, then the operating electromagnet 65 is energized from a suitable supply source connected with the supply lines L1, L2 and attracts the armature 63 to move valvular member 62 away from seat 66 to initiate flow of the heating medium through the parallel path 13 into the finned tube heat exchange coil 46 and thereby release heat to the room air. The thermostat 80 may be provided with a preheat coil 83 connected in series circuit with the operating electromagnet 65 so as to produce the well-known cycling action of the room air temperature responsive thermostat 80 during heating operation. Such cycling thermostat operation will periodically open and close valve 60 so as to admit sufficient heating medium to the heat exchange coil 46 to maintain the desired temperature as determined by adjustment of contact 81 in the room under varying heating demand conditions.

Since the cooling control electromagnetic valve 61 is rendered ineffective by the check valve 18 during circulation of heating medium in the direction indicated by the arrow, any contact of the room thermostat 80 with the contact 82 is immaterial as the flow through the parallel path 14 is always blocked by the check valve 18.

When the ambient temperature conditions are such as to require cooling of the room, cooling medium is circulated in the opposite direction through the system. In this case check valve 17 blocks the flow of cooling medium through the path 13 while the reversed check valve 18 opens to permit flow through the parallel path 14. Thus when the room air temperature responsive thermostat 80 engages with contact 82, operating electromagnet 75 will be energized through the conductors 86, 87 so as to attract plunger 73 and move valve 72 from seat 76 to initiate flow through the parallel path 17. Thus cooling medium is circulated through the finned heat exchanger coil 46 in the opposite direction to produce a cooling of the room air. When the room temperature drops below the value to which contact 82 is adjusted, then thermostat 80 disengages contact 82 and deenergizes the operating electromagnet 75 so as to return valve 72 into engagement with seat 76 and thereby stop the flow of cooling medium through the finned coil 46. In this way the thermostat 80 controls the electromagnetic valve 61 so as to maintain a desired room temperature during cooling operation.

Due to the fact that check valve 17 blocks flow through the parallel path during cooling operation, any engagement of thermostat 80 with contact 81 is immaterial. Thus the improvements of the present invention provide the advantages of a high degree of flexibility. The room occupant can separately adjust the member 34 and 44 shown in Fig. 1 or contacts 81 and 82 shown in Fig. 2 as he may desire for either heating or cooling without encountering any difficulties imposed by any fixed relationships between the two. Ordinarily the room occupant will wish to hold a lower temperature for heating than for cooling but the difference between the two settings may be anything desired since there is no differential adjustment required which might be difficult for the occupant to understand and use.

What I claim as new and desire to secure by Letters Patent of the United States is:

1. A reverse circulation control having in combination, a pair of flow control valves having separately adjustable thermostatic operating means, one opening the corresponding valve and the other closing the corresponding valve upon temperature change in the same direction, a pair of check valves operable in opposite directions, and conduit means for interconnecting the corresponding thermostatic and check valves in series with each other and in parallel paths in a reverse flow heating and cooling medium system to provide opposite thermostatic flow control in said paths upon reverse flow of heating and cooling medium in the system.

2. A heat exchange fluid reverse circulation control having in combination a pair of flow control valves having separate thermostatic bellows operating means, one of said bellows means having connections for opening the corresponding valve upon a rise in a temperature condition and the other of said bellows means having connections for closing the corresponding valve upon a rise in said temperature condition, conduit means interconnecting said valves to separately control parallel flow paths, and a pair of check valves operable in opposite directions, each connected in a corresponding one of said flow paths for selectively rendering the corresponding condition responsive valve effective only upon flow in a corresponding direction.

3. A fluid reverse circulation control having in combination a pair of flow control valves having separate thermostatic bellows operating means provided with separate means for adjusting the response thereof to the same temperature condition, one of said bellows means having connections for opening the corresponding valve upon a rise in said temperature condition and the other of said bellows means having connections for closing the corresponding flow control valve upon a rise in said temperature condition, conduit means interconnecting said valves separately to control parallel flow paths, and a pair of check valves operable in opposite directions, each connected in a corresponding one of said flow paths for selectively rendering the corresponding condition responsive valve effective only upon flow in a corresponding direction.

4. A reverse fluid circulation control apparatus having, in combination, a pair of flow control valves each having operating means responsive to a condition dependent upon the flow of fluid through said apparatus, said operating means being separately adjustable, one of said operating means opening its corresponding valve and the other closing its corresponding valve upon a condition change in the same direction, a pair of check valves operable in opposite directions, and conduit means for interconnecting the corresponding control valves and check valves in series with each other and in parallel paths in a reverse fluid flow heat transfer system to provide opposite flow control in said paths upon reverse flow of said fluid in the system.

5. A heating and cooling system comprising a heat exchanger, a source of heating fluid, a source of cooling fluid, means for connecting either of said sources alternatively to said system, said means being arranged to circulate the heating fluid through said heat exchanger in a direction opposite to that of the cooling fluid, and control means for regulating the rate of flow of said fluid, said means comprising parallel fluid flow paths connected in said system, a pair of check valves operable in opposite directions and each connected in a corresponding flow path so that heating fluid flows through one of said paths in one direction and cooling fluid through the other of said paths in an opposite direction, a pair of flow control valves each connected in corresponding paths, and means responsive to a condition dependent upon the circulation of said fluid for actuating said valves to control the rate of flow of fluid through each of said paths.

ROBERT U. BERRY.

REFERENCES CITED

The following references are of record in the file of this patent:

UNITED STATES PATENTS

| Number | Name | Date |
|---|---|---|
| Re. 22,685 | Carrier | Oct. 30, 1945 |
| 840,876 | Steedman | Jan. 8, 1907 |